(12) United States Patent
Taylor (10) Patent No.: US 7,370,671 B2
(45) Date of Patent: May 13, 2008

(54) VALVE ACTIVATION ASSEMBLY WHICH MECHANICALLY COLLAPSES A COLLAPSIBLE MEMBER IN RESPONSE TO BOTH OVERPRESSURE AND UNDERPRESSURE CONDITIONS

(75) Inventor: Julian S. Taylor, Oklahoma City, OK (US)

(73) Assignee: Taylor Innovations, L.L.C., Oklahoma City, OK (US)

( * ) Notice: Subject to any disclaimer, the term of this patent is extended or adjusted under 35 U.S.C. 154(b) by 36 days.

(21) Appl. No.: 11/544,386

(22) Filed: Oct. 6, 2006

(65) Prior Publication Data

US 2008/0083467 A1    Apr. 10, 2008

(51) Int. Cl.
 *F16K 17/40* (2006.01)
(52) U.S. Cl. ............... 137/624.27; 137/70; 137/458
(58) Field of Classification Search ........... 137/624.27, 137/70, 71, 67, 461, 458
See application file for complete search history.

(56) References Cited

U.S. PATENT DOCUMENTS

| | | | |
|---|---|---|---|
| 2,733,729 A | 2/1956 | Wolfe | |
| 3,038,485 A | 6/1962 | Hosek | |
| 3,042,057 A | 7/1962 | Zorgdrager et al. | |
| 3,542,052 A | 11/1970 | Irwin | |
| 3,602,249 A * | 8/1971 | Zingg | 137/377 |
| 3,941,151 A | 3/1976 | Biddle | |
| 4,724,857 A | 2/1988 | Taylor | |
| 4,977,918 A | 12/1990 | Taylor | |
| 5,024,416 A | 6/1991 | Cohen | |
| 5,067,511 A | 11/1991 | Taylor | |
| 5,209,253 A | 5/1993 | Taylor | |
| 5,226,442 A | 7/1993 | Taylor | |
| 5,291,918 A * | 3/1994 | Johnson | 137/458 |
| 5,297,575 A | 3/1994 | Taylor | |
| 5,433,239 A | 7/1995 | Taylor | |
| 5,607,140 A | 3/1997 | Short, III et al. | |
| 5,685,329 A | 11/1997 | Taylor | |
| 6,152,167 A * | 11/2000 | Baker | 137/458 |

(Continued)

OTHER PUBLICATIONS

BS&B Safety Systems, An Introduction to Rupture Disk Technology; Catalog 77-1001; Section A, BS&B Safety Systems (Tulsa, OK), (Jan. 1, 1998).

(Continued)

*Primary Examiner*—Kevin Lee
(74) *Attorney, Agent, or Firm*—Fellers, Snider, et al.

(57) ABSTRACT

A valve activation assembly which mechanically collapses a collapsible member, such as a buckling pin, in response to both overpressure and underpressure conditions of a pressurized fluid. A retention member retains the valve member in a selected position with respect to the fluid, such as an open or closed position. A piston assembly is configured to mechanically collapse the collapsible member both when a fluidic pressure upon the piston assembly exceeds a first level, and when a fluidic pressure upon the piston assembly falls below a second level. Upon collapse of the collapsible member, the valve member releases the valve member, allowing the valve member to move to a different selected position (such as closed or open, respectively). A third piston member and a biasing member thereon can also be utilized. In some embodiments, a fluid is preferably held in compression between selected piston members.

24 Claims, 11 Drawing Sheets

U.S. PATENT DOCUMENTS 6,155,284 A    12/2000  Scantlin
6,491,055 B2   12/2002  Brazier et al.
6,666,230 B1   12/2003  Taylor
6,799,597 B1   10/2004  Taylor
6,895,926 B1    5/2005  Moreau et al.

OTHER PUBLICATIONS

BS&B Safety Systems, Safety Relief Valves in Combination With Rupture Disks; Catalog 77-1006; Section B, BS&B Safety Systems (Tulsa, OK).

* cited by examiner

FIG. 1

OPEN POSITION

NO SYSTEM PRESSURE

VALVE ACTIVATION ASSEMBLY WHICH MECHANICALLY COLLAPSES A COLLAPSIBLE MEMBER IN RESPONSE TO BOTH OVERPRESSURE AND UNDERPRESSURE CONDITIONS

FIELD OF THE INVENTION

The claimed invention relates generally to pressurized fluid systems and more particularly, but not by way of limitation, to a valve activation assembly which mechanically collapses a collapsible member, such as a buckling pin, in response to both overpressure and underpressure conditions in a pressurized fluid.

BACKGROUND

Pressurized fluid systems are typically provided with pressure control and relief capabilities to reduce the possibility of injury to humans and damage to equipment in the event of an overpressure situation. Such pressure control systems often use a pressure responsive member such as a buckling pin that mechanically collapses when subjected to a large increase in fluid pressure. Failure of the pressure responsive member allows a valve assembly to operate to establish an appropriate overpressure path for the fluid, such as by establishing a bypass path for the fluid or by shutting down a flow of the fluid.

While such systems typically operate to provide protection from overpressure conditions, there are also applications where it is desirable to detect and abate underpressure conditions as well. For example, a rupture in a pressurized pipeline or similar network can result in a drop in system pressure as the fluid escapes to the external environment. In such a case it is desirable to activate a valve assembly to establish a secondary path for the fluid (such as an upstream shutoff valve which halts further flow of the fluid) until the rupture condition can be remediated.

There is therefore a continued need for improvements in the art to provide a pressure control system that operates when a pressure of a pressurized fluid falls outside a selected operating range, both above the range in an overpressure context as well as below the range in an underpressure context. It is to such improvements that preferred embodiments of the present invention are generally directed.

SUMMARY OF THE INVENTION

Preferred embodiments of the present invention are generally directed to a valve activation assembly which mechanically collapses a collapsible member, such as a buckling pin, in response to both overpressure and underpressure conditions of a pressurized fluid.

In accordance with preferred embodiments, a retention member retains the valve member in a selected position with respect to the fluid, such as an open or closed position. A piston assembly is coupled to the retention member and the collapsible member is coupled to the piston assembly.

The piston assembly is preferably configured to mechanically collapse the collapsible member both when a fluidic pressure upon the piston assembly exceeds a first level, and when a fluidic pressure upon the piston assembly falls below a second level. Upon collapse of the collapsible member, the valve member activates the valve member, preferably by releasing the same. This allows the valve member to move to a different selected position (such as closed or open, respectively).

In further preferred embodiments, the piston assembly comprises a third piston member adapted for sliding movement along a central shaft adjacent the first and second piston members. A biasing member preferably exerts a force upon the third piston member to maintain compression of a volume of the pressurized fluid adjacent the second piston member. In this way, the system can be readily adapted to accommodate a wide variety of fluids, including gasses and liquids.

These and various other features and advantages which characterize the claimed invention will become apparent upon reading the following detailed description and upon reviewing the associated drawings.

DETAILED DESCRIPTION

Figure 1:
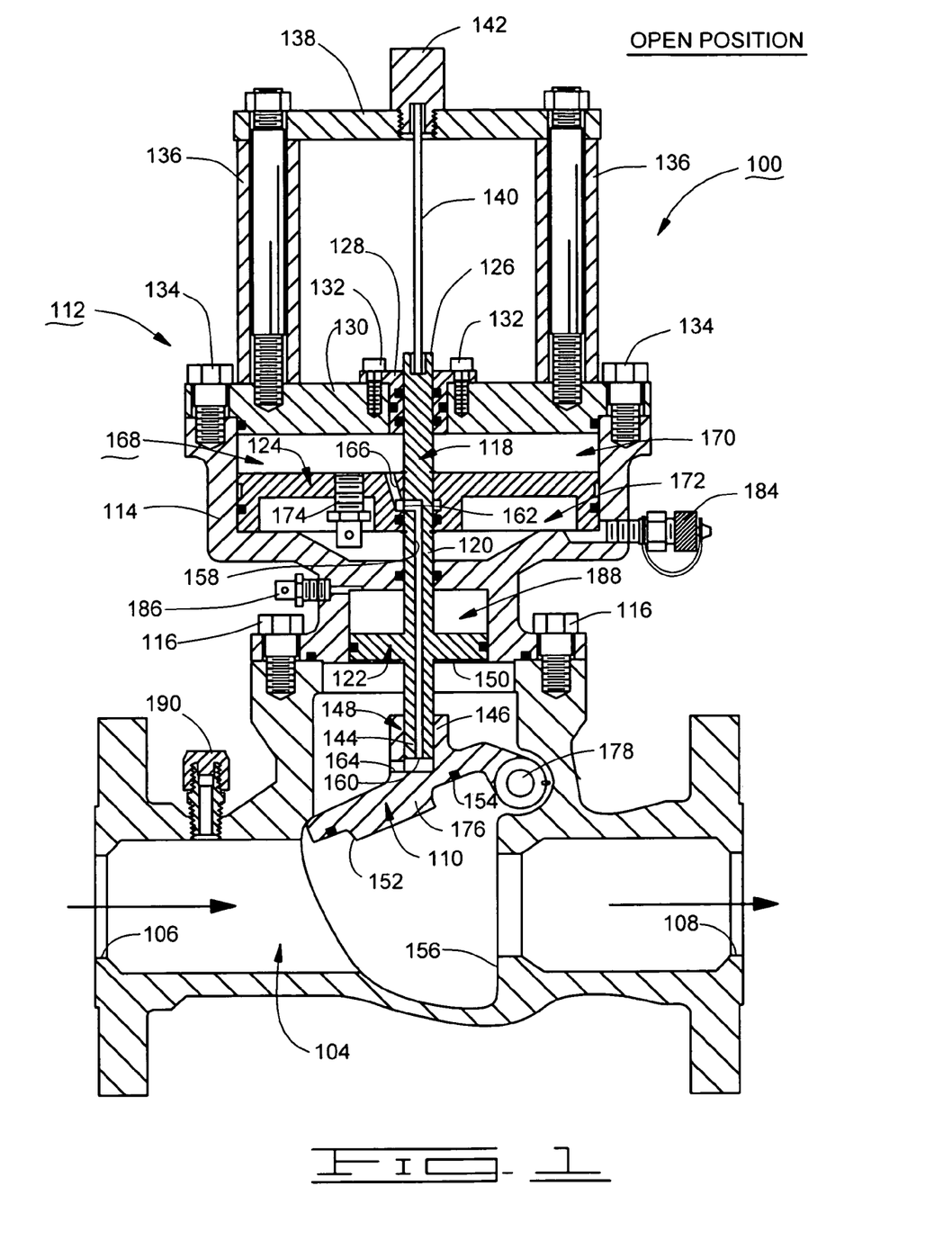
FIG. 1 is an elevational, cross-sectional view of a valve assembly in accordance with preferred embodiments of the present invention, the valve assembly shown in a normally open (NO) position.

FIG. 1 shows a valve assembly 100 constructed in accordance with preferred embodiments of the present invention. It is contemplated that the valve assembly 100 forms a portion of a larger pressurized fluid transport system or network in which the valve assembly 100 operates as an emergency shut-down valve. Such characterization is for purposes of illustration, however, and is not limiting.

The valve assembly 100 comprises a rigid housing 102 with interior conduit 104. A flow of pressurized fluid, such as a pressurized gas, normally passes along the conduit 104 from inlet 106 to outlet 108. A valve member 110, preferably characterized as an offset flapper type valve, is disposed within the housing 102 to selectively regulate the flow of pressurized fluid along the conduit 104. It will be noted that the valve member 110 is in a normally open (NO) position, although such is not limiting.

A valve activation assembly is shown generally at 112 to include a body portion 114 that is secured to the housing 102 via fasteners 116. A piston assembly 118 extends through the body portion 114 and preferably includes a central shaft 120 to which are attached first and second piston members 122, 124. An upper end 126 of the shaft 120 extends through a sealing plug 128. The sealing plug 128 is secured within an aperture of a lower plate 130 via fasteners 132. The lower plate 130 is secured to the body portion 114 via fasteners 134.

Standoffs 136 support an upper plate 138 a selected distance above the lower plate 130. A collapsible member 140, preferably characterized as a buckling pin, is compressively held between the upper end 126 of the shaft 120, and a pin holding nut 142 in the upper plate 138.

A lower end of the central shaft 120 preferably forms a retention member 144, also referred to herein as a locking pin. The locking pin 144 preferably engages an interior, annular recess 146 of a stem projection 148 of the valve member 110. The locking pin thus serves to retain the valve member 110 in a selected position with respect to the pressurized fluid in the conduit 104 (in this case, in a normally open position). The frictional contact between the lower end 144 and the sidewall of the recess 146 will preferably be sufficient to maintain the valve member 110 in the selected position.

Other retention mechanism configurations are readily contemplated including arrangements that utilize latches, braces, magnets, etc. to maintain the valve member in the selected position. Moreover, the retention mechanism can readily be configured to normally bias the valve member in a closed position instead of the open position shown in FIG. 1.

Figure 2:
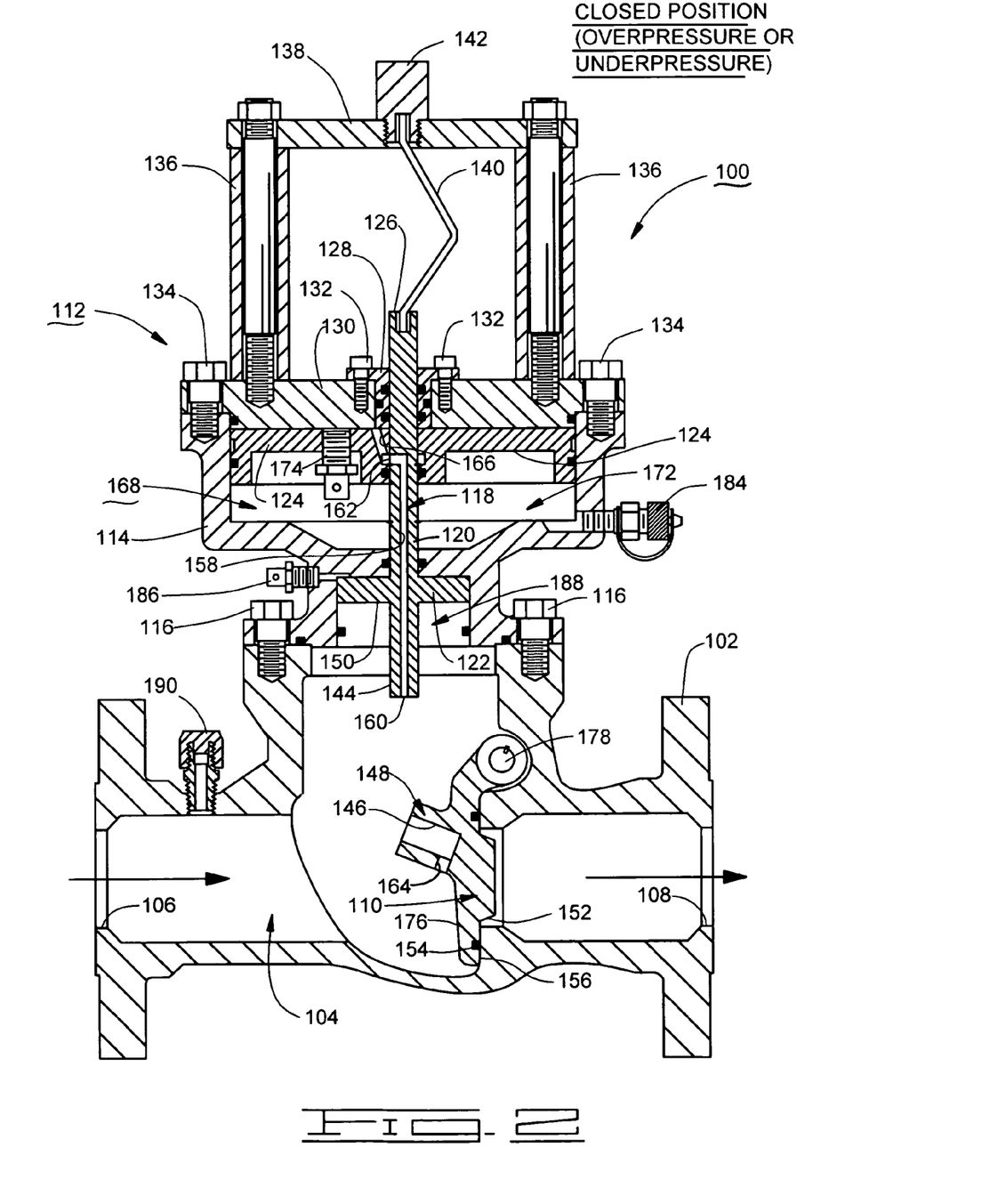
FIG. 2 shows the valve assembly of FIG. 1 in a closed position in response to an overpressure or an underpressure condition.

The valve activation assembly 112 is preferably configured to selectively release the retention of the valve member 110 so that the valve member 110 moves to a closed position as shown in FIG. 2. This occurs both in response to an overpressure condition, as well as in response to an underpressure condition. Preferred operation in response to each of these conditions will now be discussed in turn, beginning with an overpressure condition.

As mentioned previously, the valve assembly 100 is preferably configured to remain open during normal system operation while the pressure of the pressurized fluid is within a normal operational range. The particular range will depend on the requirements of a given application, but in the present case an exemplary normal pressurized level for the fluid will be contemplated as on the order of about 1000 pounds per square inch (psi). Thus, the valve member 112 will remain in the normally open position shown in FIG. 1 so long as the pressurized fluid remains in the vicinity of this nominal pressure level.

During such operation, a portion of the pressurized fluid in the conduit 104 will flow around the valve member 110 and bear against a lower piston surface 150 of the first piston member 122. The surface area of surface 150, and the mechanical characteristics of the collapsible member 140, are respectively selected such that under normal pressures the upwardly directed force upon the first piston member 122 will be insufficient to induce mechanical collapse of the member 140.

At such point that the pressure of the fluid exceeds a first level, the force imparted to surface 150 will be sufficient to mechanically collapse the collapsible member 140 in accordance with Euler's Law. As shown in FIG. 2, the preferred mode of mechanical collapse is a controlled mechanical deformation whereby the member 140 is bent in three locations. The first level will preferably comprise a selected percentage above the nominal pressure of 1000 psi, such as +20% (e.g., about 1200 psi). The actual upper activation threshold level, of course, can be selected as desired depending on the requirements of a given application.

As the member 140 is mechanically collapsed, the central shaft 120 moves upwardly, thereby retracting the locking pin 144 from the stem 148. The fluid passing along the conduit 104 will thereafter engage the leading edge of the valve member 110 to urge the valve member 110 to the closed position shown in FIG. 2. Preferably, the valve member includes an annular projection 152 which extends downwardly into the conduit 104. The projection 152 presents surface area to the incoming fluid to help effect the movement of the valve member 110 to the desired position. An annular sealing member 154 of the valve member 110 preferably engages a sidewall 156 of the conduit 104 in order to provide a fluidic seal once the valve member 110 has been moved to the closed position.

With regard to an underpressure condition, it will be noted that the ultimate result is generally the same; that is, upon the occurrence of an underpressure condition, the collapsible member 140 is mechanically collapsed, the locking pin 144 is retracted and the valve member 110 moves to the closed position. However, forces are applied to the piston assembly 118 in a somewhat different manner in order to initiate this sequence. The underpressure condition can arise from a number of sources, such as a failure of an upstream or downstream device, a rupture or a leak in an upstream or downstream conduit path, and so on.

Figure 3:
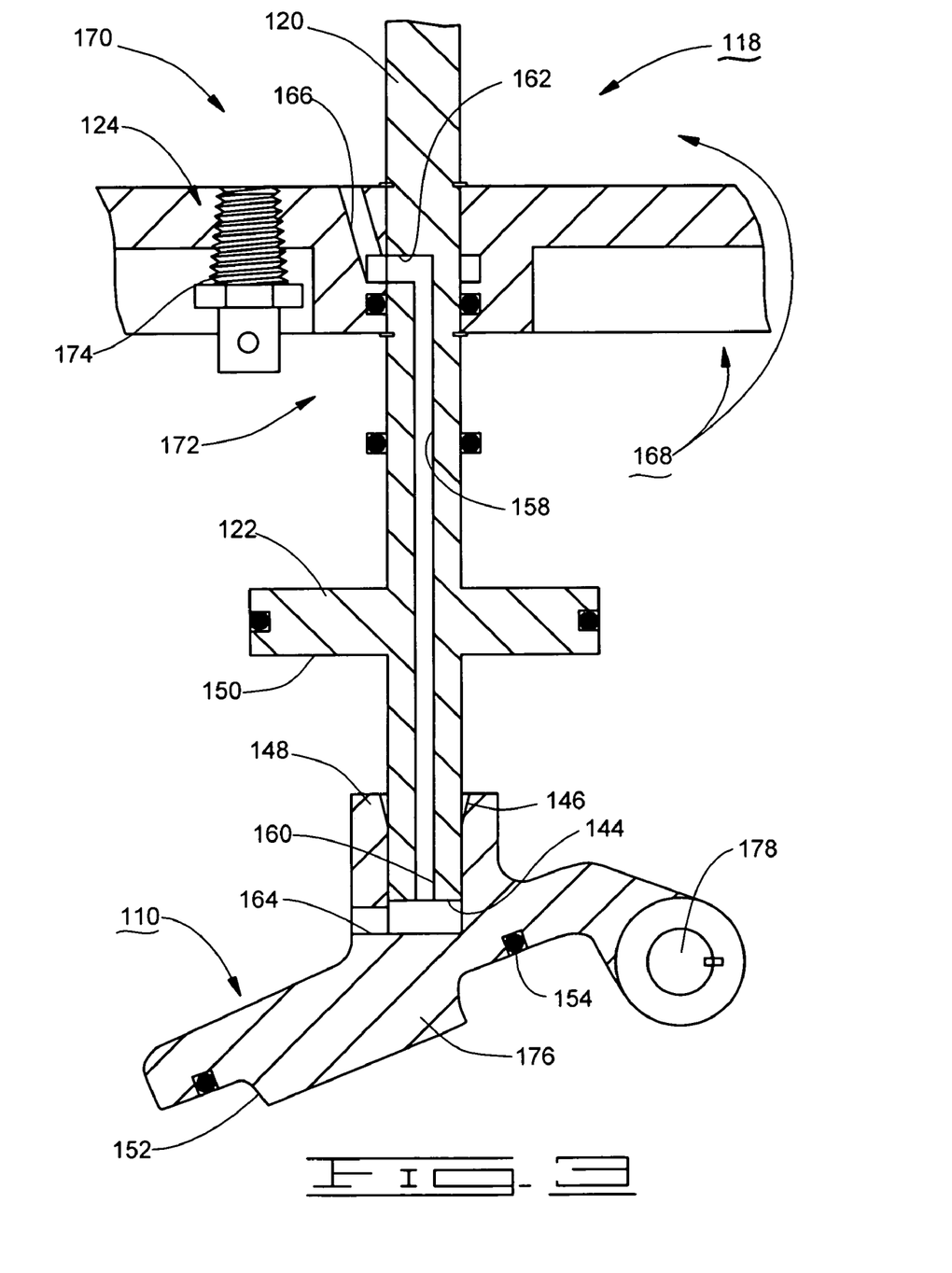
FIG. 3 shows selected portions of the valve assembly of FIG. 1 in greater detail.

FIG. 3 shows the piston assembly 118 in greater detail. The central shaft 120 of the piston assembly 118 is shown to include an interior passageway 158 with an inlet 160 at the lower end 144 of the shaft 120 and an outlet 162 at a medial portion of the shaft 120. The valve member 110 includes an interior passageway 164 which extends through the stem 148 of the valve member 110 to a position adjacent the inlet 160. The second piston member 124 includes an interior passageway 166 adjacent the outlet 162.

In this way, a portion of the pressurized fluid passes from the conduit 104, through passageway 164, inlet 160, passageway 158, outlet 162 and passageway 166 to pressurize a chamber 168 in which the second piston member 124 is disposed. For clarity, the chamber 168 is formed by sidewall portions of the body 114, the stem 128 and the lower plate 130. The chamber 168 is divided by the piston member 124 to provide an upper portion 170 (upper space) above the piston member 124, and a lower portion 172 (lower space) below the piston member 124.

The second piston member 124 further preferably includes a one-way check valve 174. The check valve 174 allows fluid to flow from the upper portion 170 to the lower portion 172, but not vice versa. More particularly, the check valve 174 preferably includes a conventional ball and seat arrangement. When the pressure of the upper portion 170 exceeds that of the lower portion 172, the ball will be unseated and fluid will flow past the ball and to the lower portion 172. Once the respective pressures in the upper and lower portions 170, 172 are substantially equal, an internal spring or other similar biasing mechanism will seat the ball, preventing further fluidic flow into the lower portion 172.

It will be noted that during normal operation, the pressurized fluid in the upper portion 170 will exert a downwardly directed force upon the second piston member 124, and this force will substantially equal an upwardly directed force upon the second piston member 124 by the pressurized fluid in the lower portion 172. Further, any increase in system fluidic pressure experienced by the upper portion 170 will be transmitted to the lower portion 172 via the check valve 174. Thus, the second piston member 124 preferably maintains a "neutral" buoyancy during both normal operation and overpressure conditions.

However, should the pressure of the pressurized fluid in the conduit 104 subsequently undergo a reduction in pressure, the pressure in the upper portion 170. The check valve 174 will generally prevent any fluidic flow from the lower portion 172 to the upper portion 170, so that the lower portion 172 will retain the same pressure level as before.

Once the pressure of the pressurized fluid falls below a second level, the differential pressure across the second piston member 124 will be sufficient to induce mechanical collapse of the collapsible member 140. This second, lower threshold level will be influenced by a number of factors including the surface area of the second piston member 124, but will generally comprise a selected percentage below the nominal pressure level such as −50% (e.g., 500 psi). As before, the particular value for this lower threshold level can be set to any suitable value in accordance with the requirements of a given application.

Figure 4:
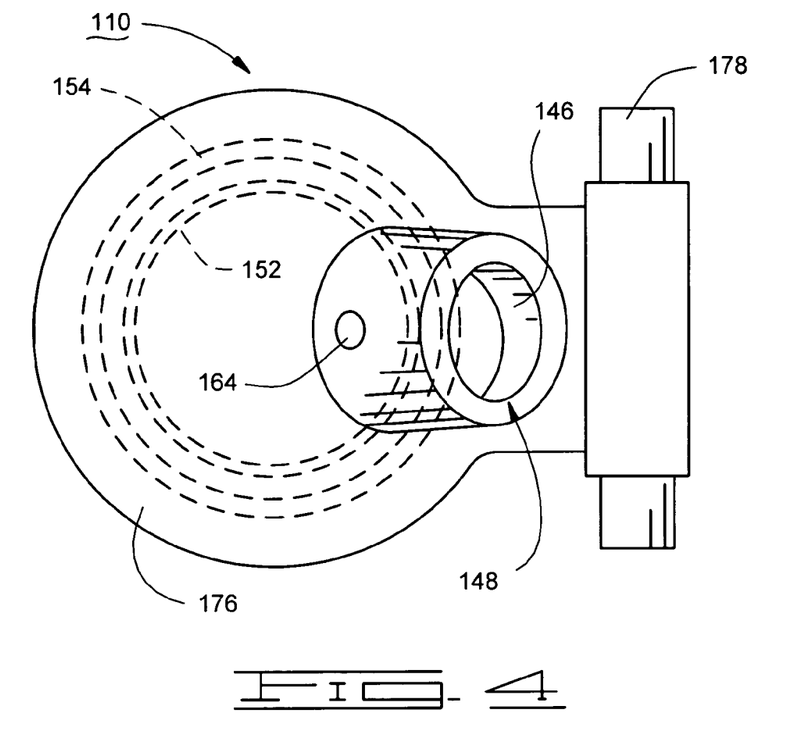
FIG. 4 provides a top plan view of a flapper valve member of the valve assembly of FIGS. 1 and 2.

FIG. 4 provides a top plan representation of the valve member 110 to further illustrate various features previously described. The valve member 110 preferably includes a substantially disc-shaped valve body 176 cantilevered from a support shaft 178. The support shaft 178 extends through, and is supported by, the housing 102, and preferably rotates with the pivotal movement of the body 176 between the open and closed positions.

Figure 5:
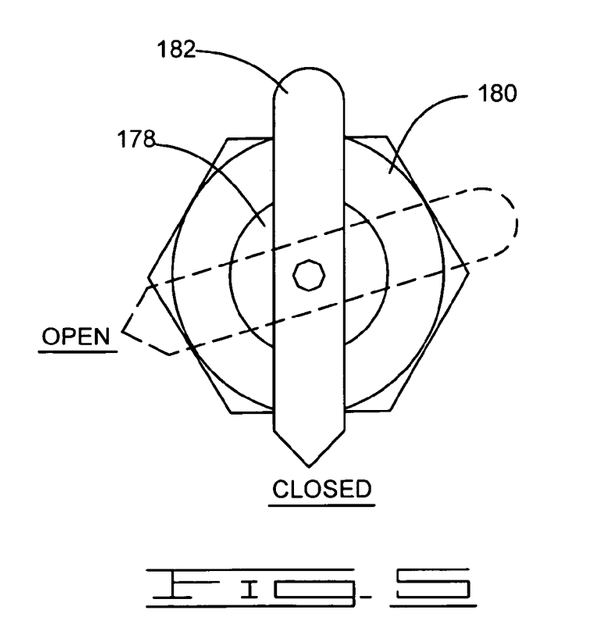
FIG. 5 shows a user handle that engages the flapper valve member of FIG. 4 to reset the flapper valve member.

As shown in FIG. 5, an annular packing gland 180 or similar sealing mechanism provides a seal about the shaft 178. An exterior user reset handle 182 preferably couples to the shaft 178 to allow a user to manually move the valve member 110 to the open position.

To reset the system from the closed position of FIG. 2 to the operational position of FIG. 1, system pressure is first preferably removed, such as by the closing of an upstream valve. The pin retention nut 142 is disengaged from the upper plate 138 and the collapsed member 140 is removed. Preferably, a pressure release plug 184 is temporarily opened to vent pressure from the lower portion 172.

The user utilizes the handle 182 to move the valve member 110 to the open position, and pushes the piston assembly 118 downwardly to engage the locking pin 144 into the recess 146. Proper engagement can be readily assured through user attempts to rotate the handle 118 away from the open position after such engagement.

A new, replacement collapsible member 140 is inserted into the upper end 126 of the piston assembly 118, and the pin holding nut 142 is replaced. At this point, the valve assembly 100 is ready for reintroduction of system pressure and normal operation.

Finally, FIGS. 1 and 2 show the valve assembly 100 to preferably include a vent member 186 coupled to a chamber 188 in which the first piston member 122 is slidingly disposed. The vent member 186 preferably communicates with the surrounding atmosphere and allows the venting of air from the chamber 188 as the first piston member 122 is moved upwardly. A separate pressure relief poppet-type valve 190 is also preferably provided adjacent the inlet 106. This valve 188 opens in the event that a significantly higher pressure is obtained once the valve member 110 has moved to the closed position of FIG. 2.

Figure 6:
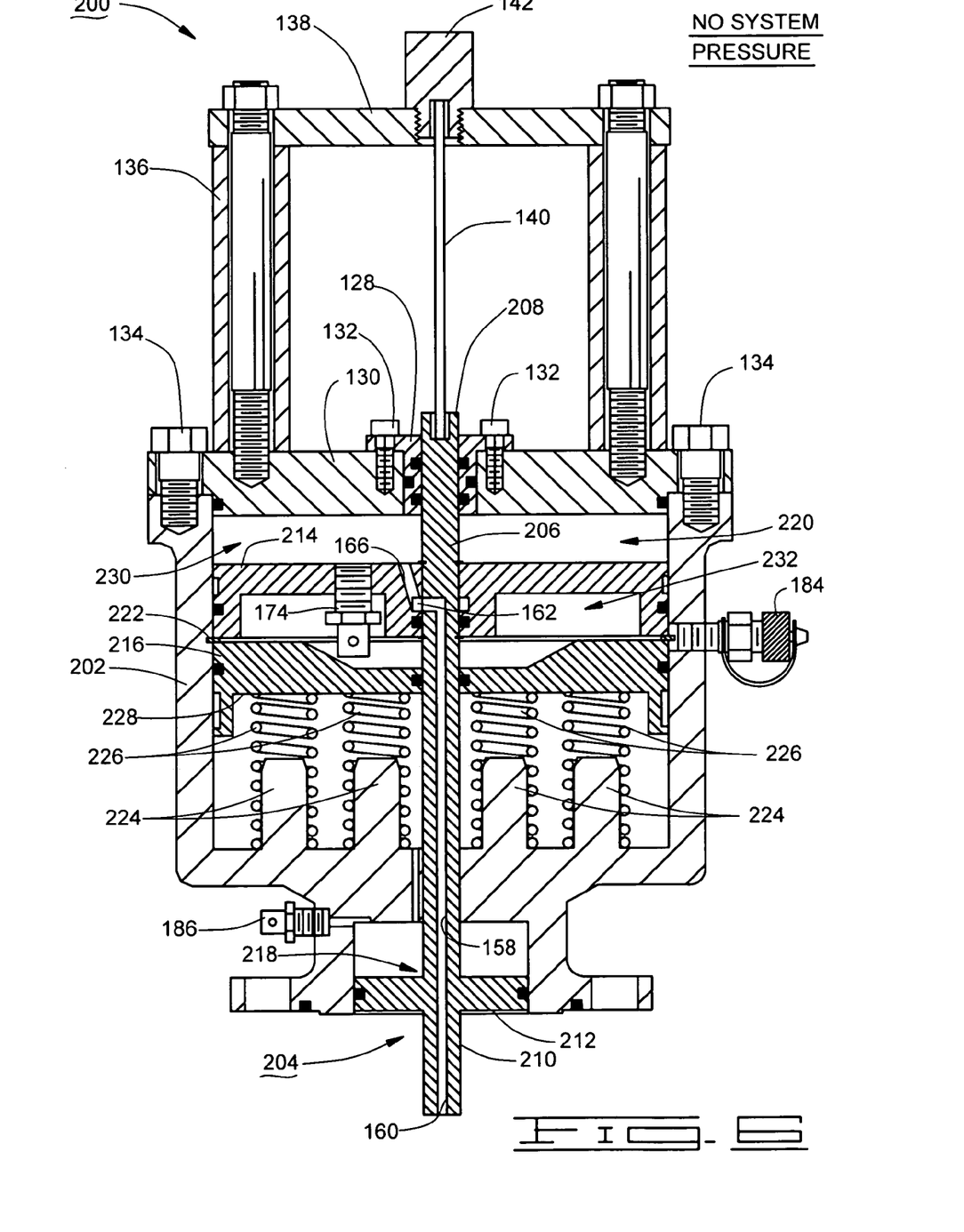
FIG. 6 provides an elevational, cross-sectional view of relevant portions of a valve assembly constructed in accordance with alternative preferred embodiments of the present invention, the valve assembly in an unpressurized state.

FIG. 6 shows an alternative valve assembly to that set forth in FIG. 1, and like reference numerals have been used to denote similar components previously discussed. In particular, FIG. 6 provides a valve activation assembly 200 suitable, for example, for coupling to the housing 102 of FIG. 1 to activate the valve member 110 in the event of an overpressure or an underpressure condition. As with the system of FIGS. 1-5, the valve activation assembly 200 in FIG. 6 can alternatively be used in other environments, including to activate a normally closed valve.

Figure 7:
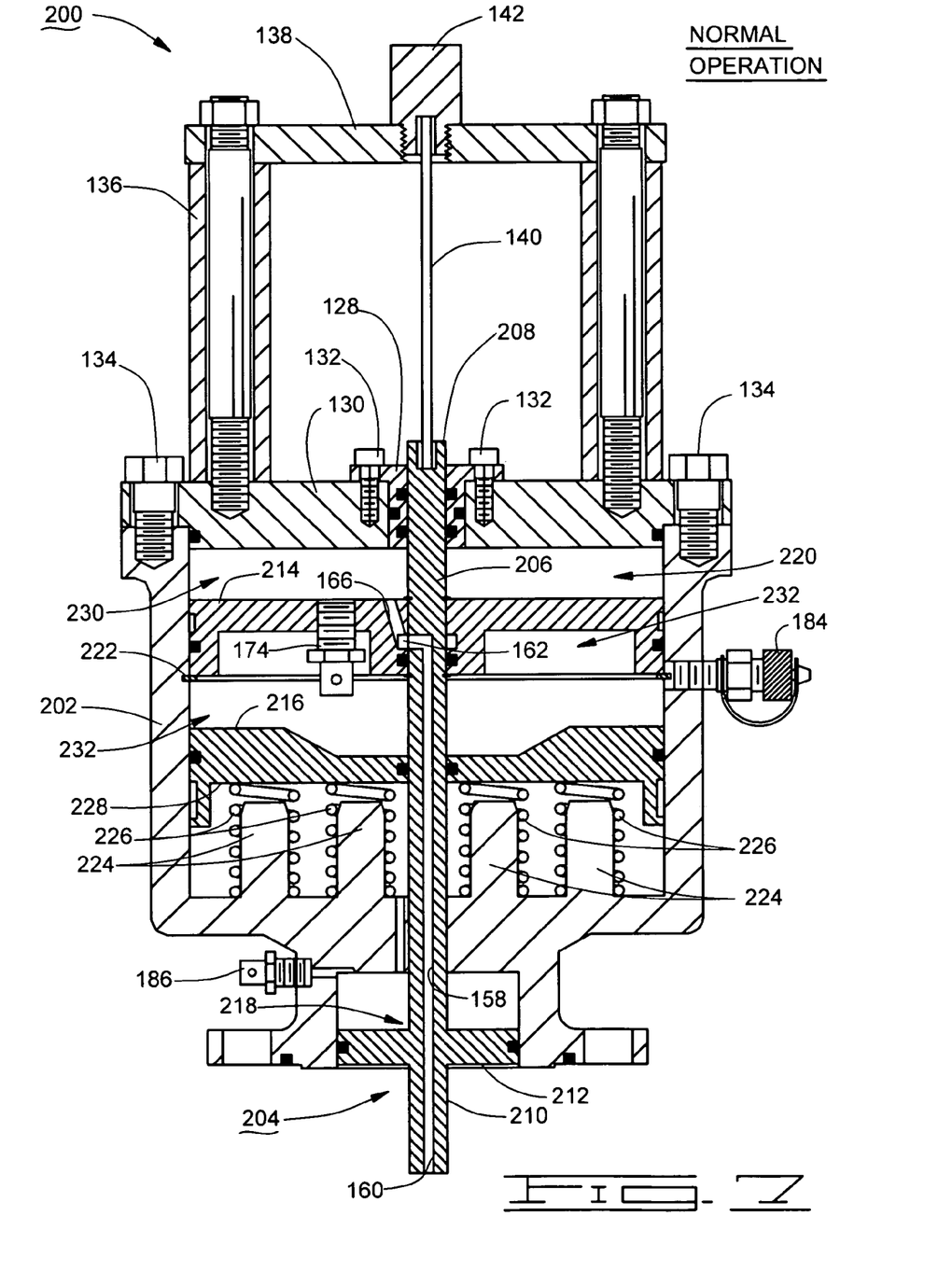
FIG. 7 shows the valve assembly of FIG. 6 during normal system operation.
Figure 8:
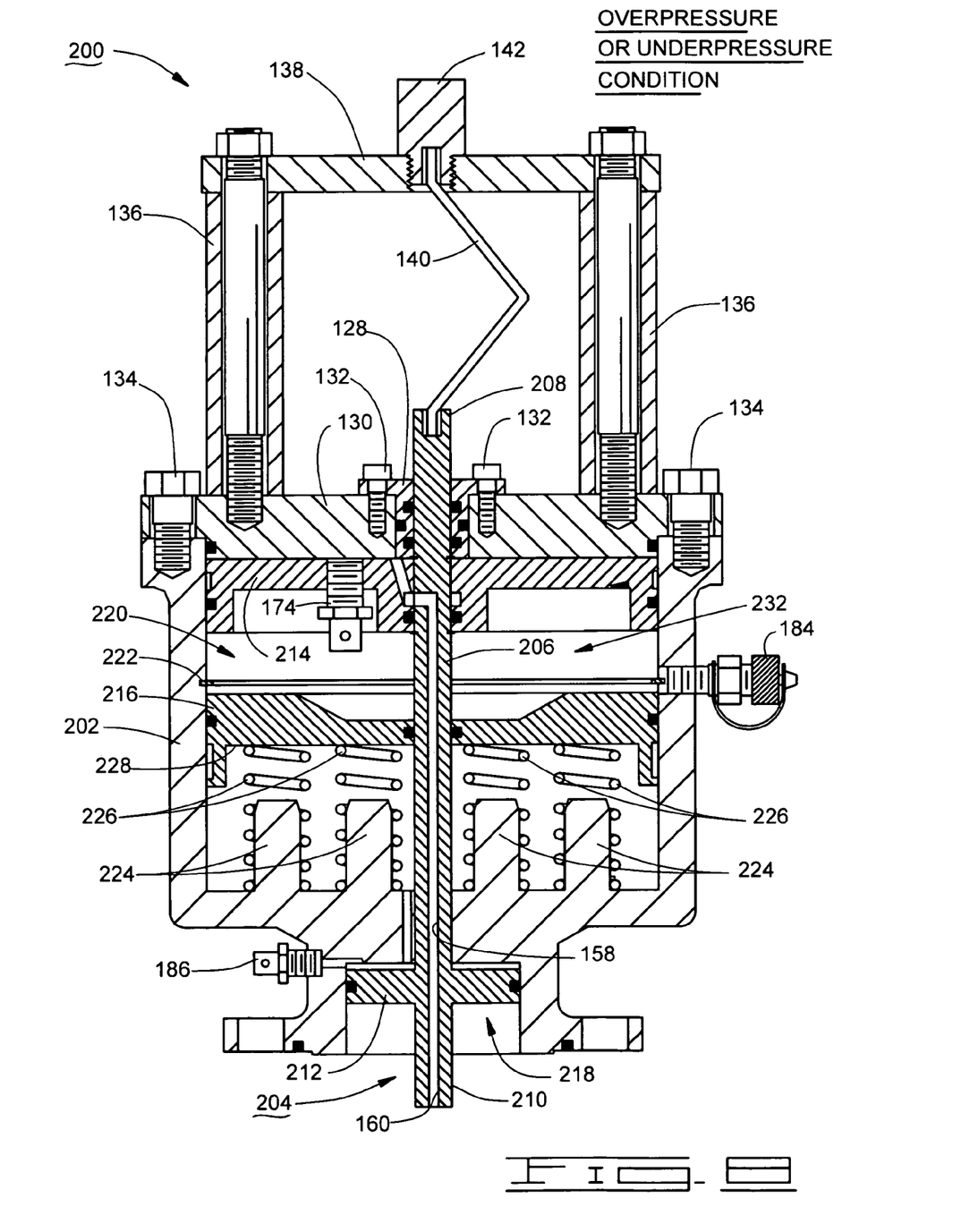
FIG. 8 shows the valve assembly of FIGS. 5 and 6 in an altered position in response to an overpressure or an underpressure condition.

For reference, the assembly 200 is shown in FIG. 6 in a deactivated condition where no system (fluidic) pressure is present. FIG. 7 shows the assembly 200 in the presence of normal system pressure, and FIG. 8 shows the assembly 200 in response to an overpressure or an underpressure condition.

As explained in greater detail below, the embodiments of FIGS. 1-5 and FIGS. 6-8 can each be advantageously used with any number of different types of pressurized fluids. However, it is contemplated that the embodiments of FIGS. 1-5 are particularly useful when the pressurized fluid substantially constitutes a pressurized gas, whereas the embodiments of FIGS. 6-8 are particularly useful for a pressurized liquid.

As shown in FIG. 6, a rigid body 202 is configured for attachment to a valve housing. A piston assembly 204 extends through the body 202 and preferably includes a central shaft 206. As before, an upper end 208 of the central shaft 206 supports the collapsible member 140, and a lower end 210 of the central shaft 206 operates as, or is coupled to, a retention member to engage the valve member in a selected position. Also as before, the central shaft 206 preferably has an interior passageway 158 with inlet 160 and outlet 162.

The piston assembly 204 further preferably includes first, second and third piston members 212, 214 and 216. The first and second piston members 212, 214 are preferably rigidly affixed to the shaft 206 as before. The third piston member 216 is preferably configured for sliding movement along the central shaft 206 between the first and second piston members 212, 214.

In the event of an overpressure condition, as before the pressure of the pressurized fluid will act upon the first piston member 212 to cause upward movement of the first piston member 212 within chamber 218, thereby collapsing the collapsible member 140 and retracting the retention member (see FIG. 8). Operation in the event of an underpressure condition will require more detailed explanation, as will now be discussed.

As shown in FIG. 6, the body 202 forms a relatively large interior chamber 220 in which the second and third piston members 214, 216 are disposed. A retention stop 222, preferably in the form of an annular snap ring, serves to provide a lower limit to the axial movement of the second piston member 214 and to provide an upper limit to the axial movement of the first piston member 216.

The body 202 further preferably includes a number of upwardly directed supports 224, or posts, which extend into the interior chamber 220 under the third piston member 216. Biasing members 226, preferably characterized as coiled springs, are disposed about the supports 224 and serve to exert an upwardly directed force upon a bottom surface 228 of the third piston member 216.

While the cross-sectional view of FIGS. 6-8 show a total of four such support/biasing member combinations laterally extending across the chamber 220, it will be appreciated that preferably any number and arrangement of such combinations can be utilized across the surface 228. In a preferred embodiment, a total of eight (8) such combinations are employed in a general x-shape, with four employed in one lateral direction as shown in FIG. 6, and four employed in a second lateral direction normal to the first direction.

In other preferred embodiments, the support/biasing member combinations can be arrayed angularly around the central shaft 206 in a uniformly spaced apart relation. Whatever arrangement is employed, preferably the biasing members 226 provide a substantially balanced force upon the third piston member 216 with respect to the central shaft 206.

As mentioned previously, FIG. 6 illustrates the assembly 200 in the absence of system pressure, so that the biasing members 226 advance the third piston member 216 upwardly to its highest displacement position so as to bear against the retention ring 222. When fluidic pressure is introduced to the system 200, as shown in FIG. 7, a portion of the fluid will pass to an upper portion 230 of the chamber 220 to provide pressure above the second piston member 214. As before, the pressurized fluid will pass through the check valve 174 to pressurize a lower portion 232 of the chamber 220 below the second piston member 214.

The pressurized fluid in the lower portion 232 will serve to compress the biasing members 226 so that the third piston member 216 is moved downwardly, as shown. At such time that the respective pressures in the upper and lower portions 230, 232 reach substantial equilibrium, the check valve 174 will close, thereby capturing the pressurized fluid in the lower portion 232 between the second and third piston members 214, 216.

Thereafter, in the event of a subsequent drop in system pressure, the pressure in the upper portion 230 will be reduced. However, the biasing members 226 will continue to compress the fluid in the lower portion so that a compressive force is maintained upon the second piston member 214.

At such time that the differential pressure across the second piston member 214 is sufficient to provide a net upwardly directed force sufficient to collapse the collapsible member 140, the member 140 moves to a buckled condition as shown in FIG. 8 and the piston assembly 118 is driven upwardly. As the piston assembly 118 moves, the retention member is retracted and the valve member moves to the desired position to close (or open) the fluid flow.

The biasing members 226 advantageously serve to store energy supplied by the compressed fluid in the lower portion 232, and to subsequently utilize this stored energy to collapse the collapsible member 140. It will be noted that if the pressurized fluid is a liquid, without the biasing members 226 the reduction of pressure in the upper portion 230 would simply operate to lift the second piston member 214 off of the pressurized liquid in the lower portion 232, thereby releasing the pressure and preventing further upward movement of the piston assembly 204.

Figure 9:
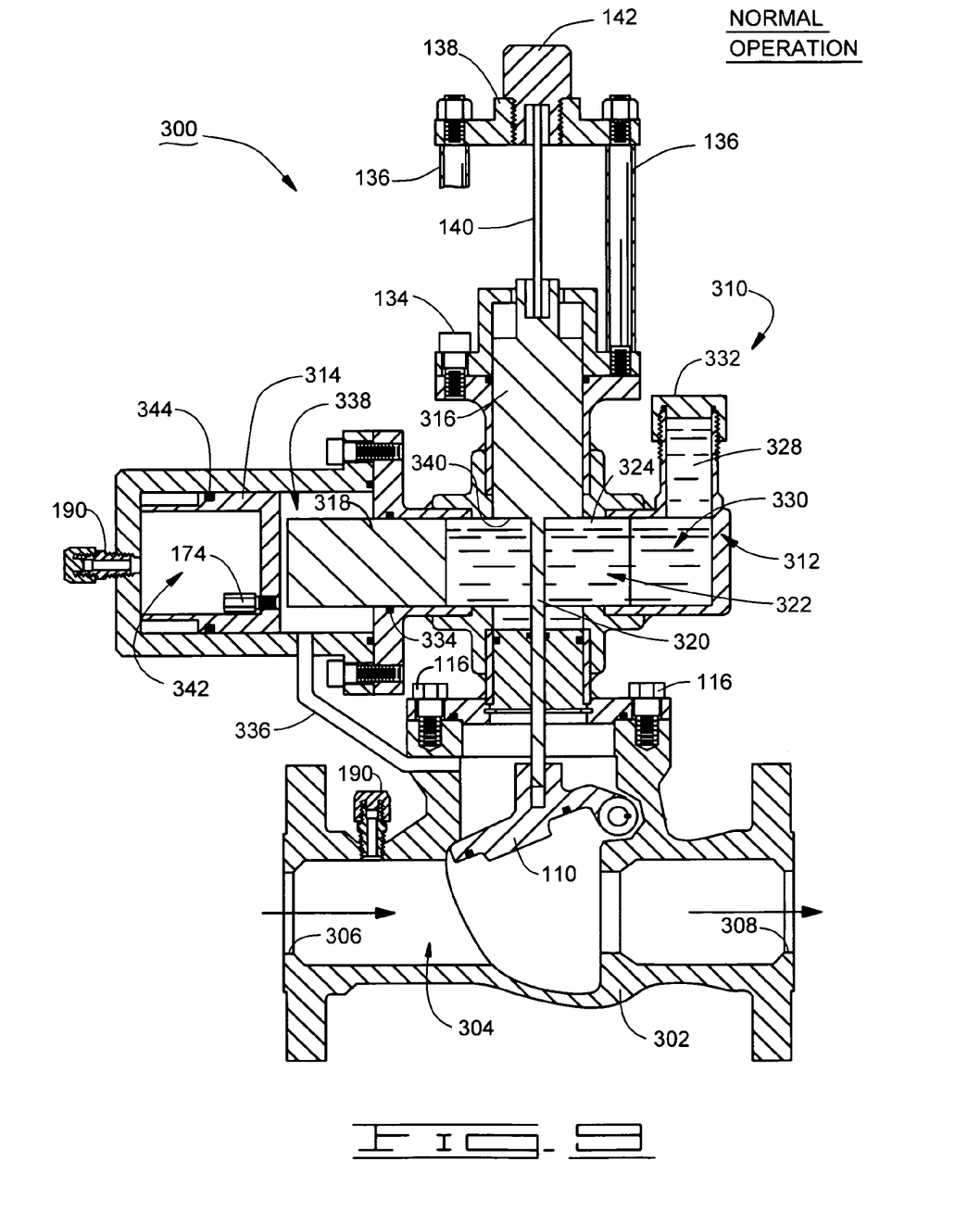
FIG. 9 provides an elevational, cross-sectional view of another alternative valve assembly in accordance with preferred embodiments of the present invention.

FIG. 9 illustrates another alternative valve system 300 constructed in accordance with preferred embodiments of the present invention. The valve system 300 operates in a manner generally similar to the embodiments set forth above to detect and abate both overpressure and underpressure conditions with respect to a transported fluid.

A housing 302 provides a conduit 304 with inlet 306 and outlet 308. As before, a valve member 110 selectively regulates the flow of pressurized fluid along the conduit 304. While shown to be normally open, a normally closed valve member can alternatively be utilized as desired.

A valve activation assembly 310 is coupled to the housing 302. The valve activation assembly 310 has a composite body portion 312 preferably made up of a number of adjoining elements, as shown. Housed within the body portion 312 are first, second and third piston members 314, 316 and 318, which cooperate in a manner set forth below to selectively activate the valve member 110 in relation to the pressure of the fluid in conduit 304.

A collapsible member 140 is supported by an upper end of the second piston member 316 as before. A retention member 320 is rigidly affixed to and extends from a lower end of the second piston member 316 and adjacent the third piston member 318 to engage the valve member 110.

Figure 10:
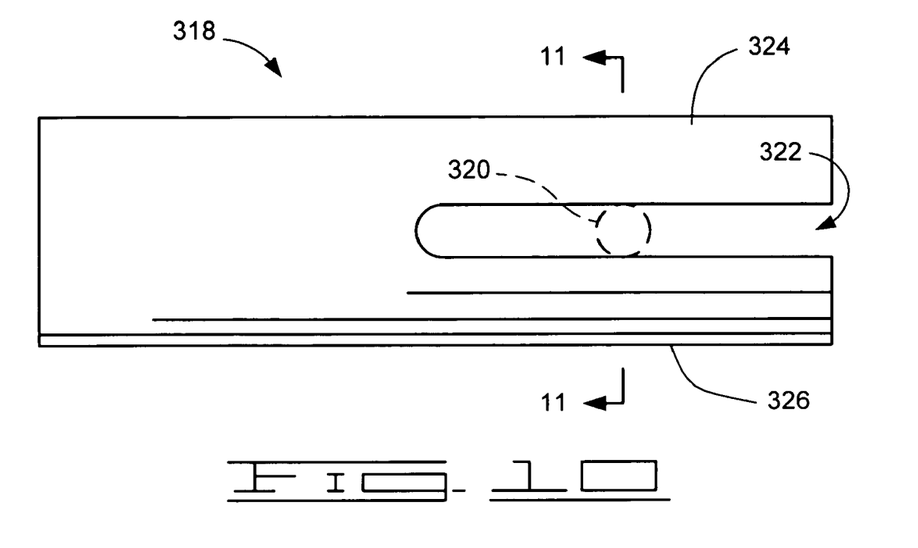
FIG. 10 provides a top plan view of a selected piston member of the valve assembly of FIG. 9.
Figure 11:
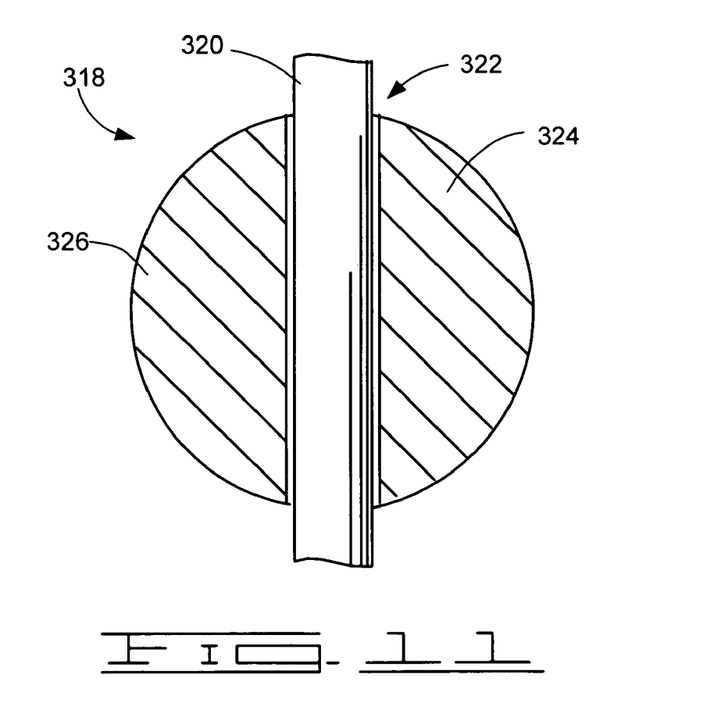
FIG. 11 provides an elevational, cross-sectional view of the piston member of FIG. 10 in conjunction with a retention member extending adjacent thereto.

More specifically, as shown in FIGS. 10 and 11, the third piston member 318 is preferably provided with a substantially cylindrical shape. A substantially u-shaped channel 322 is formed in the third piston member 318 to form opposing legs 324, 326. The channel 322 is sized to permit sliding movement of the legs 324, 326 adjacent the retention member 320 during operation.

Returning again to FIG. 9, a substantially non-compressible fluid 328, such as a suitable synthetic oil or other liquid, is placed into a chamber 330 bounded by selected surfaces of the body portion 314, the second piston member 316 and the third piston member 318. The liquid 328 is preferably introduced into the chamber 330 via sealed fill cap 332, and is retained therein by an annular sealing member 334 adjacent the third piston member 318. For reference, the fluidic chamber 330 is also referred to herein as a "first fluidic chamber."

A portion of the pressurized fluid along conduit 304 is passed via conduit 336 to a second fluidic chamber 338. Normally, the pressure of this pressurized fluid in the second fluidic chamber 338 imparts a lateral force upon the third piston member 318, thereby placing the liquid 328 in the first fluidic chamber 330 under compression. As discussed above, a liquid under compression in this way will generally tend to act as a solid mass, transmitting forces against all boundary surfaces within the chamber in which the compressed liquid is enclosed. It will be noted from FIG. 9 that one of the boundary surfaces is a lower surface 340 of the second piston member 316.

Figure 12:
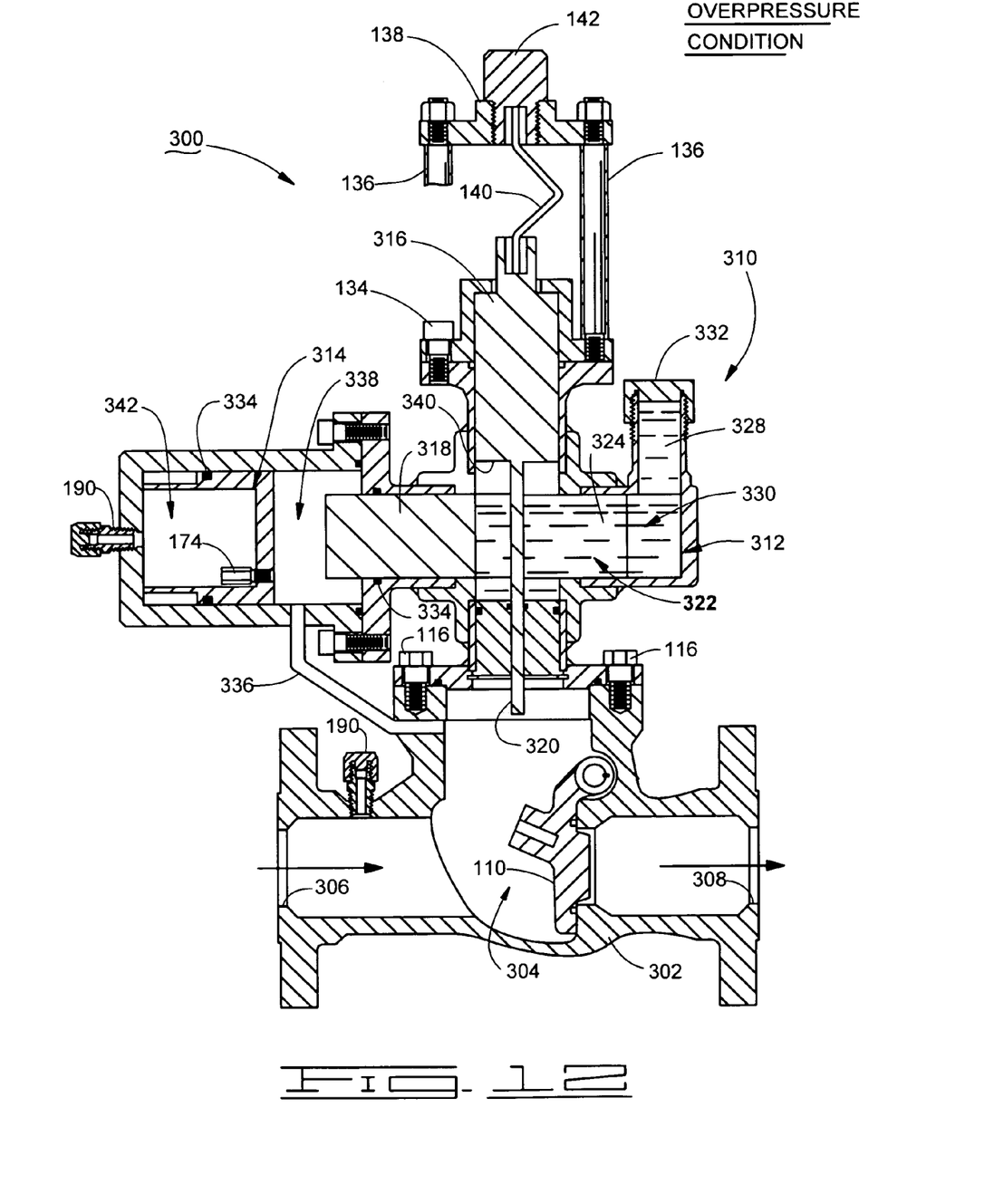
FIG. 12 shows the valve assembly of FIG. 9 in response to an overpressure condition.

As shown in FIG. 12, when the pressure of the pressurized fluid in the second fluidic chamber 338 exceeds an upper predetermined threshold, the force on the lower surface 340 from the compressed liquid 328 will be sufficient to induce mechanical collapse of the collapsible member 140. That is, the third piston member 318 will be axially displaced in a lateral direction (e.g., to the right in FIG. 12) and the second piston member 316 will be axially displaced in an upward direction. This will result in retraction of the retention member 320 from the valve member 110 and movement of the valve member 110 to the closed position.

Referring again to FIG. 9, the first piston member 314 is preferably provided with a substantially cup-shaped construction to define a third fluidic chamber 342. An annular sealing member 344 isolates the second and third chambers 338, 342. A one-way check valve 174 permits fluidic flow from the second chamber 338 to the third chamber 342 so that, during normal operation, forces upon the first piston member 314 are substantially balanced.

However, when a subsequent drop in fluidic pressure in the conduit 304 is experienced, the forces upon the first piston member 314 will no longer be balanced. Instead, a greater force will be placed upon the first piston member 314 from the pressurized fluid entrapped within chamber 342 as compared to the forces placed upon the first piston member 314 from chamber 338. The first piston member 314 will thus generally advance laterally in a direction toward the third piston member 318 (e.g., to the right) in relation to the differential pressure across the first piston member 314.

Figure 13:
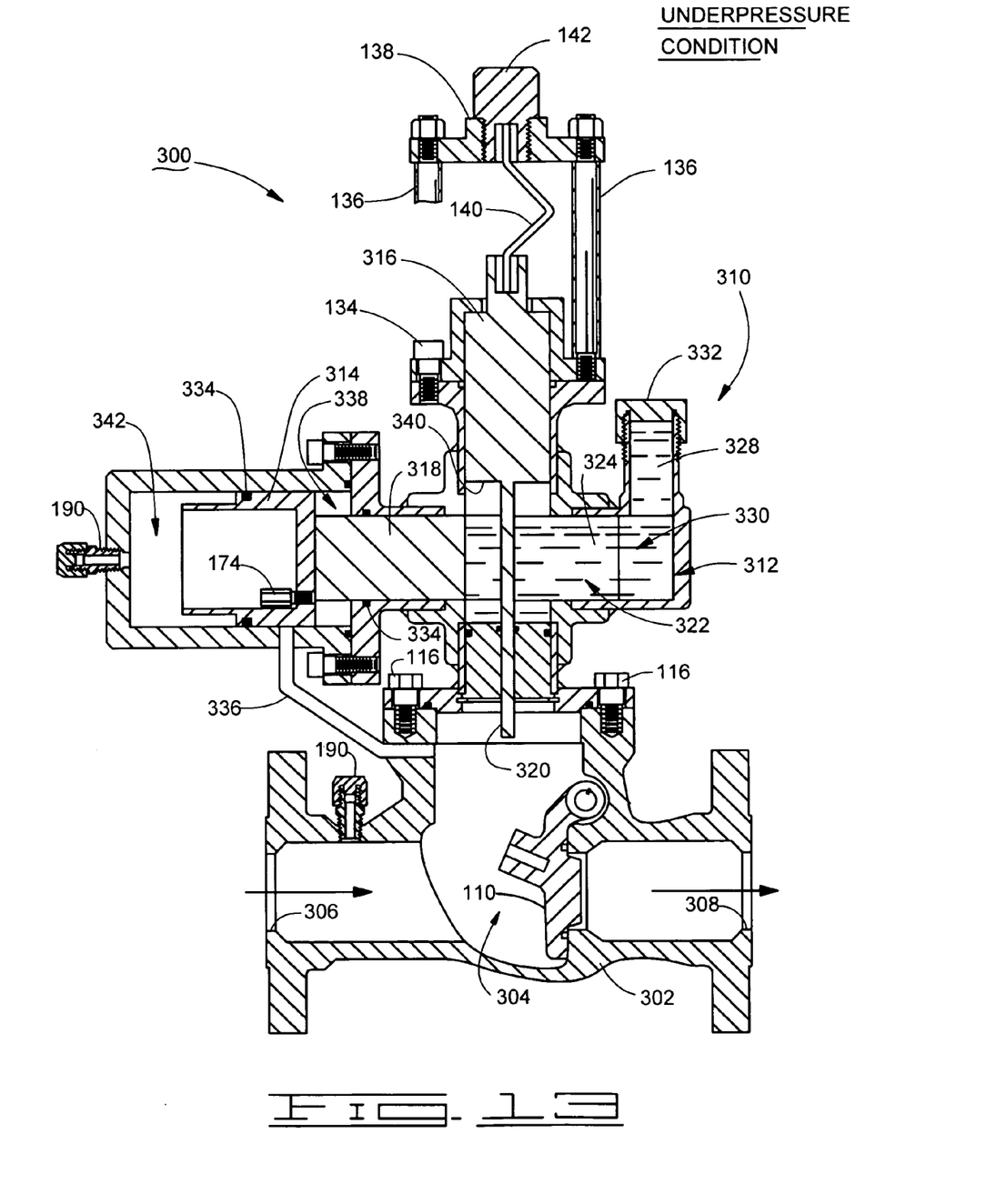
FIG. 13 shows the valve assembly of FIG. 9 in response to an underpressure condition.

As shown in FIG. 13, when the pressure of the pressurized fluid in conduit 304 falls to a lower predetermined threshold level, the differential pressure across the first piston member 314 will drive the first piston member 314 against the third piston member 318 with sufficient force to collapse the collapsible member 140 by way of the compressed liquid 328. As before, this will result in axial displacement of the second piston member 316 and retraction of the retention member 320 from the valve member 110. It will be noted that the larger diameter (surface area) of piston member 314 as compared to piston member 318 ensures net lateral movement in the desired direction to effect the retraction of member 320.

The system 300 is preferably reset from the overpressure activated state of FIG. 12, or the underpressure activated state of FIG. 13, to the normal operational state of FIG. 9 as follows. After isolating the system 300 from upstream and downstream flow (using for example, separate valves not illustrated in the drawings), bleed valve 190 in the housing 302 is temporarily opened to release any remaining pressurization of the conduit 304. A second bleed valve 190 in the body portion 312 adjacent the first piston member 314 is also temporarily opened to release pressurization of the second and third fluidic chambers 338, 342.

The user next preferably rotates the valve member 110 via an external handle (such as 182 in FIG. 5) back to the normally open position. The user depresses the upper end of second piston member 316 to lower the retention member 320 to engage the valve member 110. Proper engagement of these members can be readily verified by subsequently attempting to turn the handle 182 after the second piston member 316 has been fully reseated; if the pin member 320 has properly engaged the valve member 110, the user should not be able to further rotate the handle at this point.

Retention nut 142 is unscrewed from upper plate 138 and the mechanically collapsed (buckled) member 140 is removed and discarded. A new replacement collapsible member 140 is installed by inserting a lower end thereof into the upper portion of the second piston member 316. The upper end of the replacement collapsible member 140 is guided into the retention nut 142, and the retention nut 142 is threadingly engaged with the plate 138.

It will now be appreciated that the valve system 300 operates similarly to the systems 100, 200 to controllably abate both overpressure and underpressure conditions using the same collapsible member. An advantage of the valve system 300 is the greater isolation that is achieved between operation in overpressure and underpressure conditions as compared to the previously presented embodiments, which can be useful in particular applications.

The various preferred embodiments discussed herein provide certain advantages over the prior art. A system is provided that can accommodate both underpressure and overpressure conditions with a relatively high degree of accuracy. A single collapsible member is preferably used in both cases to activate a valve member to address the overpressure or underpressure condition, as required.

A wide variety of fluidic types, including both gasses and liquids can be accommodated for a variety of different operational pressures and upper and lower activation setpoints. Depending on the system configuration, even modest drops in downstream pressure, such as from a relatively slow leak, can be detected and abated.

While the foregoing discussion has preferably envisioned the valve member being held in a selected one of an open position and a closed position and thereafter moved to a remaining one of these positions, such is not necessarily required. Rather, the valve activation assembly can be configured as desired to hold the valve in a first position, such as partially open at a first flow rate, and then to release the valve member to move to a second position such as partially open at a different, second flow rate greater or lesser than the first rate.

Moreover, while the various preferred embodiments have preferably activated the valve member by releasing a holding force on the same, such is not necessarily required. Rather, in alternative preferred embodiments the collapse of the collapsible member induces movement of the valve member in other ways, such as by actively driving the valve member to the desired position. A linkage can be readily adapted to this purpose, as desired. Thus, reference to release of the valve member includes, but is not limited to, release of a holding force upon said member, and includes operation to actively drive the valve member to a new position.

For purposes of the appended claims, the term "mechanical collapse" will be defined consistent with the foregoing discussion as a change in shape or form of the collapsible member, such as the mechanical deformation of a buckling pin, the puncture of a frangible disk, etc. Mere displacement or movement of the member to a different location, while the member retains its original shape, is thus explicitly excluded from the definition of mechanical collapse.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising:
    a retention member configured to retain a valve member in a selected position with respect to a pressurized fluid;
    a collapsible member; and
    a piston assembly configured to mechanically collapse the collapsible member when a fluidic pressure upon the piston assembly exceeds a first level and to mechanically collapse the collapsible member when a fluidic pressure upon the piston falls below a second level, wherein upon said mechanical collapse the retention member releases said retention of the valve member in the selected position.

2. The apparatus of claim 1, wherein the retention member comprises a locking pin configured to engage the valve member to retain the valve member in the selected position.

3. The apparatus of claim 1, wherein the selected position comprises a selected one of an open position and a closed position with respect to the pressurized fluid, and wherein upon said release of the valve member by the retention member, the valve member moves to the remaining one of the open and closed positions.

4. The apparatus of claim 1, wherein the collapsible member comprises a buckling pin, and wherein each instance of said mechanical collapse of the collapsible member comprises a buckling of said buckling pin.

5. The apparatus of claim 1, wherein the piston assembly comprises a central shaft and first and second piston members rigidly attached to the central shaft.

6. The apparatus of claim 5, wherein the piston assembly further comprises a third piston member configured for sliding movement along the central shaft adjacent the first and second piston members.

7. The apparatus of claim 6, further comprising a biasing member which exerts a force upon the third piston member.

8. The apparatus of claim 5, wherein the piston assembly mechanically collapses the collapsible member in response to application of the fluidic pressure in excess of the first level against a surface of the first piston member.

9. The apparatus of claim 5, wherein the piston assembly mechanically collapses the collapsible member in response to application of the fluidic pressure below the second level as a differential pressure across the second piston member.

10. The apparatus of claim 5, wherein the piston assembly further comprises a check valve extending adjacent the second piston member to facilitate a selective flow of the pressurized fluid from a position above the second piston member to a position below the second piston member.

11. The apparatus of claim 1, wherein the piston assembly comprises at least two piston members and a liquid that is held in compression between said piston members.

12. The apparatus of claim 11, wherein at least one of said piston members is configured to move in a first axial direction and at least one of said piston members is configured to move in a second axial direction orthogonal to the first axial direction to collapse the collapsible member.

13. The apparatus of claim 1, wherein the valve member is characterized as a flapper type valve.

14. An apparatus comprising:
a valve member configured for movement between an open position and a closed position;
a retention member configured to retain the valve member in a selected one of said open and closed positions;
a piston assembly coupled to the locking pin comprising first and second piston members; and
a collapsible member configured to be mechanically collapsed in response to a fluidic pressure upon the first piston member exceeding a first level and configured to be mechanically collapsed in response to a fluidic pressure upon the second piston member falling below a second level, wherein upon said mechanical collapse the retention member is retracted and the valve member moves to the remaining one of the open and closed positions.

15. The apparatus of claim 14, wherein the retention member comprises a locking pin configured to engage the valve member to retain the valve member in the selected one of said open and closed positions.

16. The apparatus of claim 14, wherein the collapsible member comprises a buckling pin, and wherein each instance of said mechanical collapse of the collapsible member comprises a buckling of said buckling pin.

17. The apparatus of claim 14, wherein the piston assembly further comprises a central shaft to which the first and second piston members are rigidly attached, wherein a first end of said shaft is coupled to the collapsible member and a second end of said shaft is coupled to the valve member.

18. The apparatus of claim 17, wherein the piston assembly further comprises a third piston member configured for sliding movement along the central shaft adjacent the first and second piston members.

19. The apparatus of claim 14, wherein the piston assembly further comprises a third piston member.

20. The apparatus of claim 14, further comprising a check valve extending adjacent a selected piston member to facilitate a selective flow of the pressurized fluid from a position adjacent one side of the selected piston member to a position adjacent the opposite side of the selected position member.

21. The apparatus of claim 14, wherein the piston assembly further comprises a third piston member configured for sliding movement along the central shaft adjacent the first and second piston members.

22. The apparatus of claim 21, further comprising a biasing member which contactingly exerts a force upon the third piston member.

23. The apparatus of claim 14, wherein the piston assembly further comprises a liquid that is held in compression between said piston members.

24. The apparatus of claim 23, wherein at least one of said piston members is configured to move in a first axial direction and at least one of said piston members is configured to move in a second axial direction non-parallel to the first axial direction to collapse the collapsible member.

* * * * *